May 19, 1953
M. C. VACANTI ET AL
2,638,785
COMBINED REARVIEW MIRROW AND THERMOMETER
FOR MOTOR VEHICLES
Filed Oct. 12, 1950
FIG.1.
FIG.2.
FIG.3.
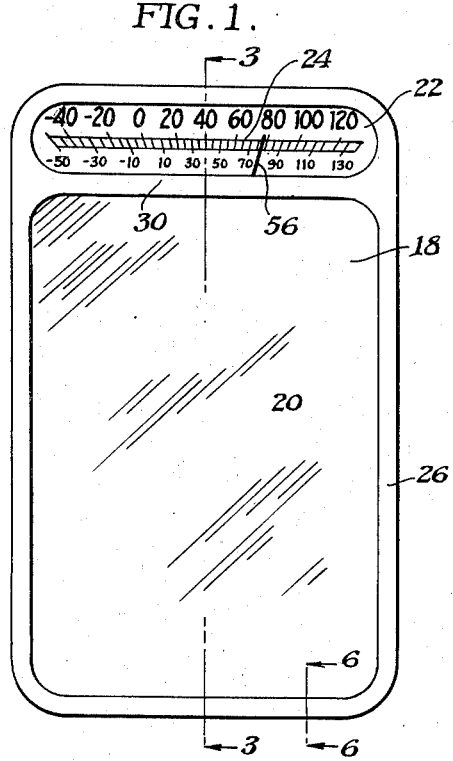
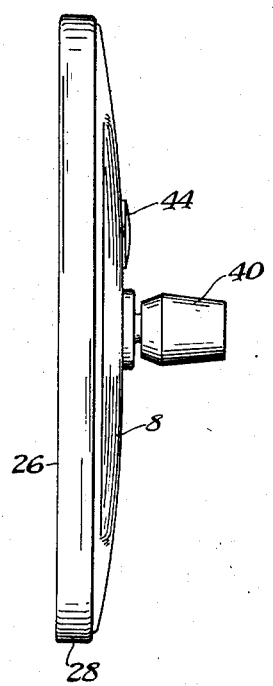
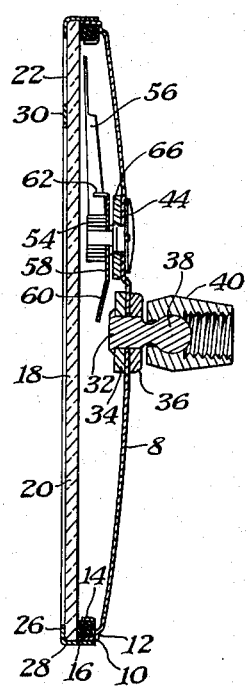
FIG.4.
FIG.5.
FIG.6.
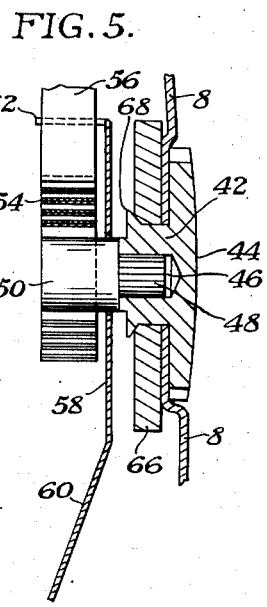
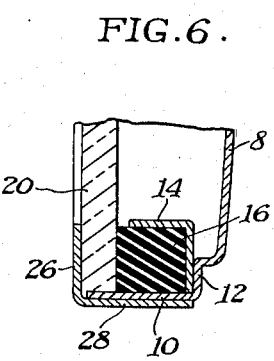
MICHAEL C. VACANTI
CLARENCE GRANATA
INVENTORS
BY Charles Shepard
ATTORNEY Patented May 19, 1953

2,638,785

UNITED STATES PATENT OFFICE 2,638,785

COMBINED REARVIEW MIRROR AND THERMOMETER FOR MOTOR VEHICLES

Michael C. Vacanti, Irondequoit, and Clarence Granata, Canandaigua, N. Y., assignors to Germanow-Simon Machine Co., Inc., Rochester, N. Y., a corporation of New York Application October 12, 1950, Serial No. 189,858

3 Claims. (Cl. 73—367)

The present invention relates to accessories attachable to road vehicles to apprise the operator of driving conditions and more particularly to the indicator type of thermometers for inside or outside readings (but especially the latter) and it has for its object to provide a simple, durable, inexpensive and reliable article of this nature.

Another object of the invention is to provide therein a needle index element, in cooperation with a thermometer scale, so mounted, arranged, and controlled that it will not be affected by the shocks and jaws of road travel that otherwise cause such a needle to continuously vibrate and render its proper reading indeterminable.

A further object is to provide an assembly of the foregoing including a casing that will lend itself to conjoint use as a rear view mirror or similar adjunct also useful to the motorist.

These and other desirable objects are accomplished by the construction disclosed as an illustrative embodiment of the invention in the following description and in the accompanying drawings forming a part hereof, in which:

Fig. 1 is a front view of a combined thermometer and rear view mirror for road vehicles constructed in accordance with and illustrating one embodiment of the present invention;

Fig. 2 is a side view thereof;

Fig. 3 is a vertical central section taken on the line 3—3 of Fig. 1;

Fig. 4 is an enlarged detail front view of the index needle and its mounting;

Fig. 5 is a sectional detail of the latter on a larger scale, taken approximately on the line 5—5 of Fig. 4 and including also other parts not shown in Fig. 4; and Fig. 6 is an enlarged fragmentary detail section through the rim of the casing taken on the line 6—6 of Fig. 1.

The same reference numerals throughout the several views indicate the same parts.

Referring more particularly to the drawings, the major element of the casing is constituted by a slightly dished back plate 8 having a forwardly projecting marginal flange 10. A jog 12 in the latter (Fig. 6) supports an interior keeper frame 14 of angular cross section that retains the bottom and inner edge of a rubber gasket 16, the outer edge of which lies against the wall 10. A preferably glass closure plate 18 rests snugly against the top surface of this gasket within flange 10. A major lower portion of its area 20 is, in the present embodiment, silvered to constitute a rear view mirror. The remaining small upper area 22 is unsilvered and transparent, and is marked in contrasting opacity with the degrees of a temperature scale 24. A cover frame 26 having a rearward marginal flange 28 cooperating with and having a tight press fit on that of the back plate 10 holds down the closure 18 and completes the casing. The cover frame has a cross bar portion 30 covering the dividing line between the silvered portion 20 and the unsilvered portion 22 of the glass and thus forming, in effect, an individual frame for the scale area 22, but without requiring any break in the continuity of the glass.

A bearing stud 32 riveted through inner and outer washers 34 and 36 at the center of back plate 8 terminates rearwardly in a ball 38 which occupies the complementary female socket in a threaded nipple 40 to constitute a universal joint by which the device may be adjusted to the proper angle for the user's view. The nipple 40 receives the tip of a bracket arm (not shown) such as is commonly used to attach external rear-view mirrors to the edge of the door or other suitable part of a vehicle body.

Also piercing the back plate 8 (Fig. 5) just above the support last described is a cap socket 42 having a rearward head 44 occupying a slight depression in the plate. Its shank is provided with the socket 46 into which is driven the knurled, reduced end 48 of a mounting stud 50 that has a fine diametrical slot 52 in its other or forward extremity. A spiral, bi-metal, spring coil 54, the thermal nature and functions of which are familiar to those skilled in the art, has its inner end (see also Fig. 4) anchored in this slot. Its outer end terminates as a continuation in an index needle 56 extending approximately radially to the stud 50 and coil 54 and cooperating with and adapted to traverse the scale 24, being viewable therewith through the panel 30.

With the structure so far described it is obvious and a matter of common experience that the delicately poised needle or index 56 on its spring coil would vibrate rapidly and fluctuate widely on both sides of the scale reading it would otherwise designate, when the device is subjected to the shocks and sways and vibrations of a moving vehicle. To counteract this tendency and produce a steady reading we subject the needle to a braking or damping action arising from the influence of an additional element which, though offering faint resistance to a slow movement of the needle, opposes a violent movement thereof by its inertia. This braking or damping element in the present embodiment consists of an arm 58 balanced intermediately to rotate or swing loosely on the stud 50 back of the coil 54, its lower end 60 being longer and hence heavier than the remainder to normally gravitationally tend to hold it in a vertical position. This lower end is also bent forwardly slightly as shown to produce a favorable center of gravity. The upper end is bent forwardly to form a flange 62 which is slotted at 64 to receive and loosely embrace the needle 56 near its base. The slot in the fork or flange 64, as clearly appears in Fig. 4, is somewhat wider than the thickness of the needle at that point, which provides a slight lost motion connection between the latter and the brake arm.

The result of this is that any sharp movement of the needle causes an impact thereof with the forked arm an instant after the force (jar) behind that movement develops so that force is absorbed by the inertia of the arm and the needle is halted or at least steadied to give a definite reading on the scale. Yet on a normal thermally induced movement of the needle the brake arm offers no appreciable resistance as it is very light itself. Without the element of sudden impact, and opposite impacts of the vibrating needle it could not contribute its inertia function.

A washer 66 surrounds the stud 42 just in front of the casing plate 8, and a shoulder on the stud is staked down over the washer at 68, to hold the parts firmly together with sufficient force to provide a tight frictional engagement with the casing.

The structure, it will be seen comprises few parts easily assembled. The cap socket, 42, the head of which, 44, is notched for the reception of a spanner which is used to turn the stud 42, 44 slightly after assembly, to calibrate the index needle with the scale.

The combination in the manner here shown of a rear view mirror and a thermometer is particularly efficacious. It combines into one instrument two articles of great usefulness to the motorist, i. e., an external mirror to indicate approach of overtaking vehicles from the rear, and a thermometer to indicate external temperature of the ambient atmosphere. Yet this combination in the particular manner here shown is made in such a way as to utilize the otherwise waste space behind the mirror portion as a working space for the bimetallic thermometer and its damping means. The continuous and unbroken cover plate 20 minimizes the problem of sealing of the interior of the casing against the weather, enabling the use of a very simple and inexpensive marginal gasket. These advantages in mechanical construction have been achieved in a way that also results in an article of pleasing and attractive appearance.

It is seen from the foregoing disclosure that the above mentioned objects of the invention are admirably fulfilled. It is to be understood that the foregoing disclosure is given by way of illustrative example only, rather than by way of limitation, and that without departing from the invention, the details may be varied within the scope of the appended claims.

What is claimed is:

1. An indicator embodying a casing having front and rear walls, the front wall including a laterally extensive scale at its top portion, and the rear wall being fitted with a forwardly projecting stud below the scale, a bi-metal spring coil carried on the stud and terminating in a vibratory index arm cooperating with the scale, and a damper brake in the form of an elongated gravitationally self-erecting arm loosely pivoted on the stud between the rear wall of the casing and the coil and having an interlocking but lost motion connection with the index arm.

2. An indicator in accordance with claim 1, in which the damper brake arm consists of a relatively short upper portion forwardly extended to make contact with the indicator arm and a relatively long lower portion depending from the stud to provide superior weight tending to maintain the upper portion so gravitationally erect.

3. An indicator in accordance with claim 2, in which the indicator arm and the coil are in the same vertical plane and the lower portion of the damper brake arm has a forward bend to locate the center of gravity in that plane.

MICHAEL C. VACANTI.
CLARENCE GRANATA.

References Cited in the file of this patent

UNITED STATES PATENTS

| Number | Name | Date |
|---|---|---|
| 1,325,547 | Wheeler | Dec. 23, 1919 |
| 1,528,082 | Schlaich | Mar. 3, 1925 |
| 2,310,503 | Widmer | Feb. 9, 1943 |
| 2,325,326 | Kiene | July 27, 1943 |
| 2,473,581 | Ford | June 21, 1949 |

FOREIGN PATENTS

| Number | Country | Date |
|---|---|---|
| 532,052 | France | Nov. 7, 1921 |
| 638,902 | Germany | Nov. 25, 1936 |